E. Farquhar,

Feed Rack.

No. 112,133.  Patented Feb. 28, 1871.

United States Patent Office.

EDWIN FARQUHAR, OF AUKENYTOWN, OHIO.

Letters Patent No. 112,133, dated February 28, 1871.

IMPROVEMENT IN PORTABLE FEED-RACKS.

The Schedule referred to in these Letters Patent and making part of the same.

*To whom it may concern:*

Figure 1:
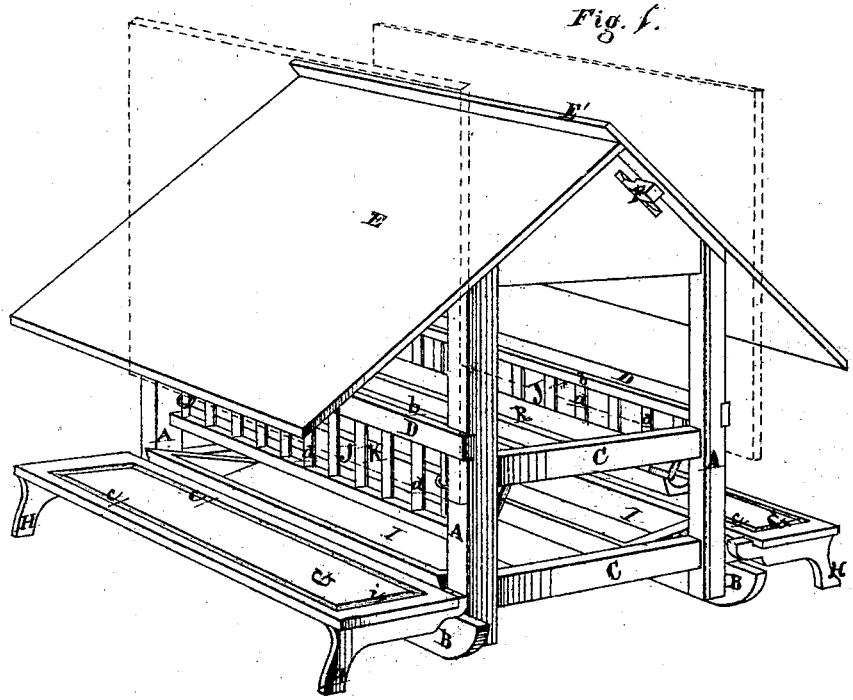
Figure 2:
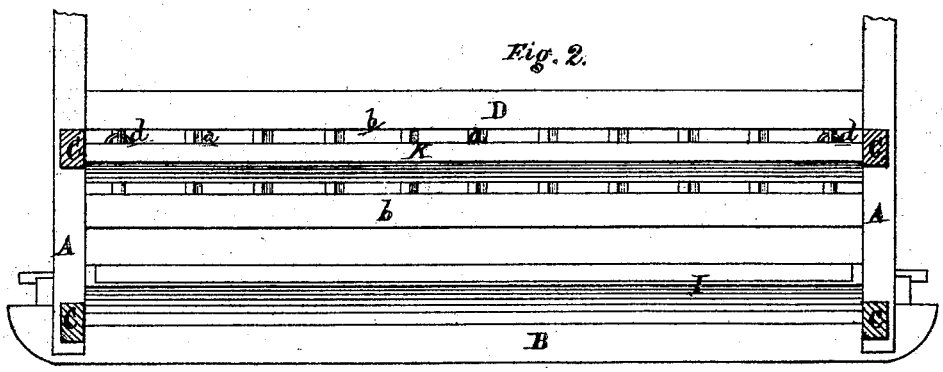

Be it known that I, EDWIN FARQUHAR, of Aukenytown, in the county of Knox and State of Ohio, have invented a new and useful Improvement in Portable-Covered Feed-Rack; and I do declare that the following is a true and accurate description thereof, reference being had to the accompanying drawing and to the letters of reference marked thereon and being a part of this specification, Figure 1 being a perspective view of my rack, showing the peculiar arrangement of the roof; and Figure 2, a plan of one side of the interior, looking outward.

Like letters refer to like parts in each figure.

The nature of this invention relates to the construction of portable-covered feed-racks, more especially designed for sheep; and consists in the peculiar arrangement and application of its various parts in a new and ingenious manner.

In the accompanying drawing—

A represents the upright corner posts;

B, the sills, which, at the same time, are runners, upon which the whole rests, and, by means of which, it may be transported from place to place, as desired;

C, the cross-ties; and

D, the longitudinal timbers, the whole forming a suitable frame, surmounted by a roof, which is made in two sections, E E', the latter overlapping the former at the apex of the roof, and each section hinged or otherwise secured to the frame, that they may be made to assume a vertical position, as shown in dotted lines, for the admission of the sun and air in fair weather, and for the purpose of allowing the racks to be filled with hay or fodder from the top.

These sections, when closed, to form a roof, are secured by the button F, or by any other suitable device.

G are platforms, hinged or pivoted to the sides of the frame, and their outer sides supported upon legs or feet, H, and are designed for the animals to stand upon while feeding.

I are troughs, extending along both sides of the frame, and rigidly secured thereto, and are designed to contain salt, grain, or other feed, such as may be appropriately fed in troughs.

J are racks, constructed in the usual manner, with a series of vertical bars, $a$, secured between other parallel bars, $b$, the lower one of the latter being pivoted between and into the corner-posts, A, so that when desired the racks may be turned down to a horizontal position.

K are horizontal troughs, extending along the entire length of the racks J, and are secured to the inner sides thereof at each end by rings, $d$, which connect the same to the vertical bars $a$ of the rack in such a manner that said troughs, K, may rest upon the hay and prevent too much waste on the part of the animals in feeding, while it may also be used as a trough for feeding salt, &c.

Around the platform G grooves, $c$, may be formed in their upper surfaces, to contain proper medicine for the purpose of preventing or curing foot-rot.

What I claim as my invention, and desire to secure by Letters Patent, is—

1. The pivoted racks J, provided with horizontal troughs, K, when constructed severally as described and shown, and arranged to operate as and for the purposes set forth.

2. The arrangement of the platforms G, troughs I, racks J, and bars K, with the roof, constructed as described, and frame and runners or sills, B, when combined together, substantially in the manner and for the purposes described.

EDWIN FARQUHAR.

Witnesses:
H. W. GREEGOR,
S. J. SPRAY.